United States Patent
Chang et al.

(10) Patent No.: US 8,135,219 B2
(45) Date of Patent: Mar. 13, 2012

(54) METHOD OF DETECTING AND COMPENSATING FAIL PIXEL IN HOLOGRAM OPTICAL STORAGE SYSTEM

(75) Inventors: Chia-Yen Chang, Hsinchu (TW); Hsin-Ping Cheng, Hsinchu (TW)

(73) Assignee: Lite-On It Corp., Taipei (TW)

( * ) Notice: Subject to any disclaimer, the term of this patent is extended or adjusted under 35 U.S.C. 154(b) by 1406 days.

(21) Appl. No.: 11/682,920

(22) Filed: Mar. 7, 2007

(65) Prior Publication Data

US 2008/0062488 A1  Mar. 13, 2008

(30) Foreign Application Priority Data

Sep. 7, 2006 (TW) ............................... 95132979 A

(51) Int. Cl.
*G06K 9/62* (2006.01)
*G03H 1/00* (2006.01)
*G03H 1/26* (2006.01)
*G03H 5/32* (2006.01)

(52) U.S. Cl. .............. 382/216; 359/22; 359/23; 359/24; 359/25; 359/26

(58) Field of Classification Search .................. 359/15, 359/22–26, 31–32, 2; 356/457; 250/550; 382/210–219, 144, 294; 345/204; 369/103
See application file for complete search history.

(56) References Cited

U.S. PATENT DOCUMENTS

| | | | | |
|---|---|---|---|---|
| 4,811,409 A * | 3/1989 | Cavan | ........................... | 382/144 |
| 5,450,218 A | 9/1995 | Heanue et al. | | |
| 5,511,058 A * | 4/1996 | Visel et al. | ..................... | 369/103 |
| 5,570,207 A * | 10/1996 | Chang | ............................... | 359/2 |
| 6,031,643 A * | 2/2000 | Burr | ................................. | 359/28 |
| 6,163,391 A * | 12/2000 | Curtis et al. | ..................... | 359/29 |
| 6,697,316 B2 | 2/2004 | Burr | | |
| 6,891,532 B2 | 5/2005 | Nara et al. | | |
| 7,453,449 B2 * | 11/2008 | Ulichney et al. | .............. | 345/204 |
| 7,656,564 B2 * | 2/2010 | Yoon | ............................. | 358/483 |
| 7,848,595 B2 * | 12/2010 | Ayres et al. | ................... | 382/294 |
| 2005/0226528 A1 | 10/2005 | Kang | | |
| 2005/0286095 A1 | 12/2005 | Yoon | | |
| 2009/0141120 A1 | 6/2009 | Kang | | |

OTHER PUBLICATIONS

Campbell, S.; Fossum, E. R., Detector arrays for digital holographic storage applications. In Holographic DataStorage, Coufal, H. J.; Psaltis, D.; Sincerbox, G. T., eds., Springer-Verlag, 2000 271-281.*
Geoffrey W. Burr, Holographic Storage, 2002.*

* cited by examiner

*Primary Examiner* — Vu Le
*Assistant Examiner* — Ha Le
(74) *Attorney, Agent, or Firm* — WPAT, PC; Justin King

(57) ABSTRACT

A method of detecting and compensating fail pixels in a holographic storage system. The method includes steps of: providing a plurality of image frames to show on a data plane for all pixels on the data plane being capable of outputting a light state or a dark state; sequentially recording the image frames into a storage medium; detecting the image frames by using a detecting apparatus for all pixels on the detecting apparatus being capable of outputting sensing signals corresponding to the light state and the dark state; defining a sensing difference value, which is a difference of the sensing signal outputting the light state and the dark state generated by one pixel; comparing the sensing difference value with a threshold value; and defining the corresponding pixel is a fail pixel if the sensing difference value is smaller than the threshold value.

19 Claims, 3 Drawing Sheets

PIROR ART

METHOD OF DETECTING AND COMPENSATING FAIL PIXEL IN HOLOGRAM OPTICAL STORAGE SYSTEM

FIELD OF THE INVENTION

The present invention relates to a holographic storage system, and more particularly to a method of detecting and compensating fail pixels in the holographic storage system.

BACKGROUND OF THE INVENTION

FIG. 1 depicts a holographic storage system, wherein the holographic storage system 100 includes: a signal beam 12, a data plane 14, a reference beam 16, a storage media 18, a data beam 22, and a detecting apparatus 20.

A light source, e.g. a laser light source, is split into two light beams by a beam splitter (not shown), one of the light beam is converted to the signal beam 12 after the light beam is emitted to the data plane 14, which means an image frame presented on the data plane 14 is also contained in the signal beam 12; and the other light beam is the reference beam 16. When the signal beam 12 and the reference beam 16 are both focused on the storage medium 18, an interference strip, which generated by the signal beam 12 and the reference beam 16, is formed on a focal point 24, wherein the interference strip can be regarded as a grating. When only the reference beam 16 is focused on the focal point 24 of the storage medium 18, the data beam 22 is generated and outputted from the extended direction of the signal beam 12. The image frame presented on the data plane 14 can be re-stored if the data beam 22 is received by the detecting apparatus 20 which is placed on the path of the data beam 22. In general, the storage medium 18 is a photopolymer.

A data-recording process in the holographic storage system 100 includes steps of: encoding the original data by a controlling circuit (not shown) and adding a correction code to the encoded data; converting the encoded data to an image frame and presenting the image frame on the data plane 14; converting a light beam to the signal beam 12 via emitting the light beam to the data plane 14; and recording the focal point 24, with an interference strip which is generated by the signal beam 12 and the reference beam 16, on the storage medium 18. By processing the above-mentioned steps, the original data can be converted to a plurality of image frames by the controlling circuit of the holographic storage system 100, and then the image frames can be recorded in the storage medium 18.

A data-reading process in the holographic storage system 100 includes steps of: focusing the reference beam 16 on the focal point 24 of the storage medium 18 to generate the data beam 22 outputted from the extended direction of the signal beam 12; placing the detecting apparatus 20 on the path of the data beam 22 for receiving the data beam 22 and presenting the image frame originally presented on the data plane 14 to the detecting apparatus 20; and decoding the image frame to the original data by the controlling circuit.

As the above statement, the recording holographic storage system at least includes: a laser beam source, a data plane 14, and a storage media 18. The read-only holographic storage system at least includes: a laser beam source, a storage media 18, and a detecting apparatus 20. The recording-and-reading holographic storage system at least includes: a laser beam source, a data plane 14, a storage media 18, and a detecting apparatus 20. Generally, the data plane 14 is a SLM (spatial light modulator), wherein the SLM can be a DMD (digital micro-mirror device) or a LCD (liquid crystal display). Both the DMD and the LCD are composed by a plurality of presenting units arranged as an array, and these presenting units with different intensities can present an image frame. In general, the each presenting unit is regarded as a pixel. The detecting apparatus 20 can be a CCD (charge-coupled device) or a CMOS (complementary metal oxide semiconductor), and both the CCD and the CMOS are also composed by a plurality of sensing units arranged as an array. The sensing units are use for receiving the image frame presented on the data plane 14, wherein the sensing unit is also regarded as a pixel.

In addition, when the detecting apparatus 20 receives the image frame contained in the data beam 22, a sensing signal is generated and outputted from each pixel according to the intensity received by the pixel. The intensity is representing a light state or representing a dark state will be further determined by the controlling circuit (not shown) processing the sensing signal. After all pixels on the detecting apparatus 20 representing a light state or a dark state are determined by the controlling circuit, the image frame can be rebuilt to the original data after the controlling circuit processing the decoding and correcting of the image frame data.

It is understood that a fail pixel may be contained in the data plane 14 or the detecting apparatus 20. Both the fail pixel contained in the data plane 14 and fail pixel contained in the detecting apparatus 20 can make the sensing signal outputted from the detecting apparatus 20 unable to be determined, so as the error rate of data recording or data reading may increase in the holographic storage system. Therefore, providing a method of detecting and compensating the fail pixels in the holographic storage system is the main purpose of the present invention.

SUMMARY OF THE INVENTION

The present invention relates to a method of detecting fail pixels in a holographic storage system, comprising steps of: sequentially providing a plurality of image frames to show on a data plane to make all pixels on the data plane capable of outputting a light state and a dark state; sequentially recording the image frames presented on the data plane in a storage medium; sequentially receiving the image frames recorded in the storage medium by using a detecting apparatus to make each pixel on the detecting apparatus can receive both the light state and the dark state and be capable of outputting a sensing signal with different values corresponding to the light state and the dark state received by the pixel; defining a sensing-difference value, which is a difference of the different values generated by one pixel; comparing the sensing-difference value with a threshold value; defining the corresponding pixel is a good pixel if the sensing-difference value is larger than the threshold value; and defining the corresponding pixel is a fail pixel if the sensing-difference value is smaller than the threshold value.

Moreover, the present invention relates to a method of compensating fail pixels in a holographic storage system, applied to a region within a data plane and the region contains a first number of light states and a second number of dark states, comprising steps of: defining a light-state sum via counting the light states generated by pixels on a detecting apparatus corresponding to the region within the data plane; defining a dark-state sum via counting the dark states generated by pixels on the detecting apparatus corresponding to the region within the data plane; defining a fail pixel outputting the dark state if the light-state sum is equal to the first number and the dark-state sum is not equal to the second number; and defining the fail pixel outputting the light state if the light-state sum is not equal to the first number and the dark-state sum is equal to the second number.

Moreover, the present invention relates to a method of detecting and compensating fail pixels in a holographic storage system, applied to a region within a data plane and the region contains a first number of light states, comprising steps of: sequentially providing a plurality of image frames to show on a data plane to make all pixels on the data plane capable of outputting a light state and a dark state; sequentially recording the image frames presented on the data plane in a storage medium; sequentially receiving the image frames recorded in the storage medium by using a detecting apparatus to make each pixel on the detecting apparatus can receive both the light state and the dark state and be capable of outputting a sensing signal with different values corresponding to the light state and the dark state received by the pixel; defining a sensing-difference value, which is a difference of the different values generated by one pixel; defining the corresponding pixel is a fail pixel if the sensing-difference value is smaller than a threshold value; defining a first number of light states in a region within the data plane; defining a light-state sum via counting the light states generated by pixels on the detecting apparatus corresponding to the region within the data plane if the fail pixel is on the region within the corresponding data plane; defining a fail pixel outputting the light state if the first number is not equal to the light-state sum; and defining the fail pixel outputting the dark state if the first number is equal to the light-state sum.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
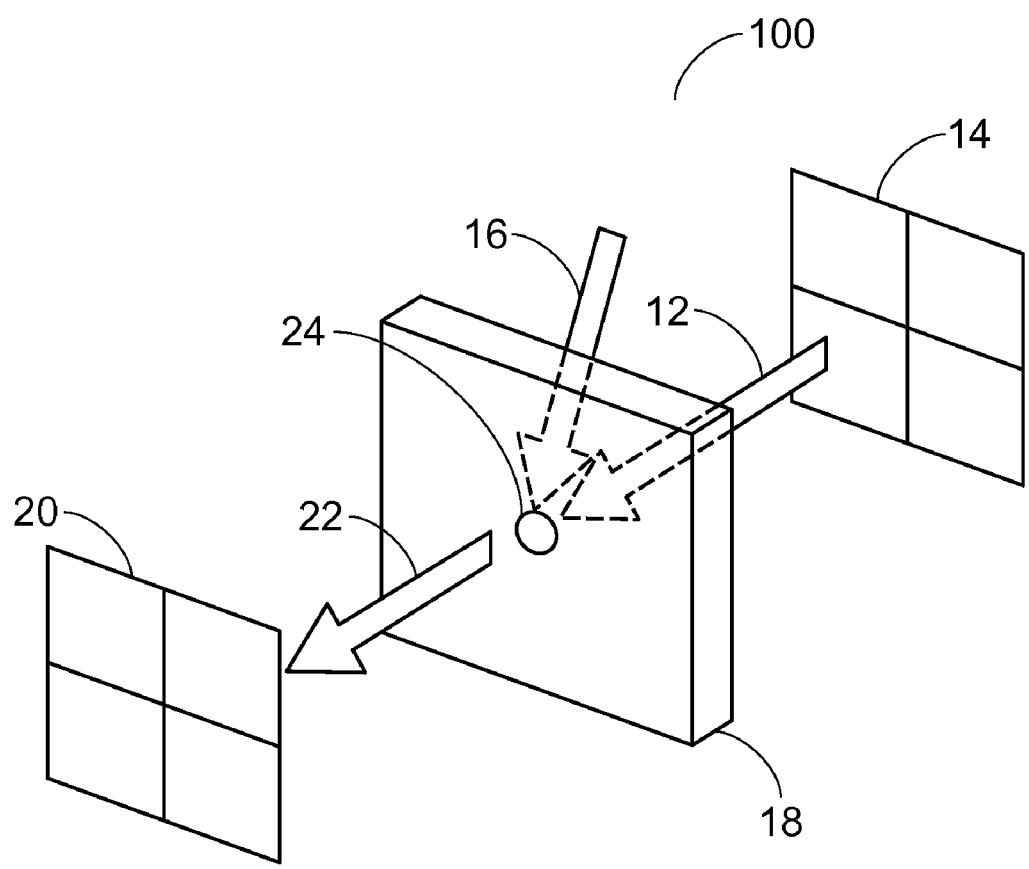
FIG. 1 is a diagram of a holographic storage system.
Figure 2:
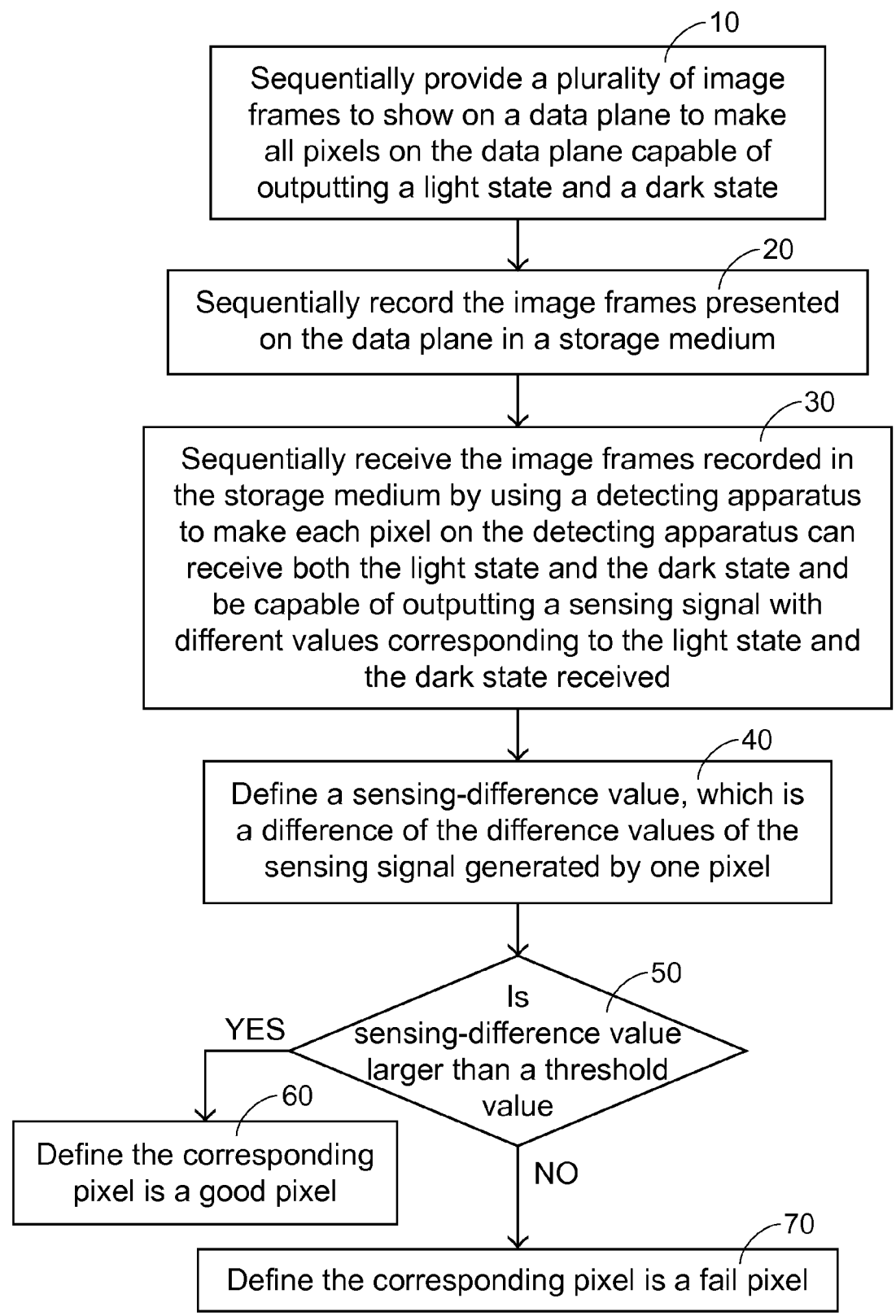
FIG. 2 is a flow chart of a method of detecting fail pixels in a holographic storage system of the present invention.

FIG. 2 is a flow chart of a method of detecting fail pixels in a holographic storage system of the present invention. The method includes steps of: sequentially providing a plurality of image frames to show on a data plane to make all pixels on the data plane capable of outputting a light state and a dark state (step 10); sequentially recording the image frames presented on the data plane in a storage medium (step 20); sequentially receiving the image frames recorded in the storage medium by using a detecting apparatus to make each pixel on the detecting apparatus can receive both the light state and the dark state and be capable of outputting a sensing signal with different values corresponding to the light state and the dark state (step 30); defining a sensing-difference value, which is a difference of the different values of the sensing signal generated by one pixel (step 40); comparing the sensing-difference value with a threshold value (step 50); defining the corresponding pixel is a good pixel if the sensing-difference value is larger than the threshold value (step 60); and defining the corresponding pixel is a fail pixel if the sensing-difference value is smaller than the threshold value (step 70).

According the embodiment of the present invention, a pixel is a good pixel or a fail pixel can be determined by the holographic storage system of the present invention according to a sensing signal generated by the pixel on the detecting apparatus. For example, if a pixel on the detecting apparatus is a fail pixel, the value of the sensing signal outputted from the fail pixel is fixed, no matter the intensity received by the pixel is represented a light state or a dark state. Because the value of the sensing signal outputted from the fail pixel is always fixed, the sensing difference value is smaller than the threshold value, therefore, the pixel is determined as a fail pixel. Alternatively, if the pixel on the detecting apparatus can output a sensing signal with different values according to the intensity received by the pixel, the sensing difference value is larger than the threshold value, so as the pixel is determined as a good pixel.

However, it is possible that the fail pixel is not on the detecting apparatus but on the data plane, and the fail pixel contained in the data plane also results in an error during the process of data reading. The fail pixel on the data plane can be also determined by the present invention. For example, if the fail pixel is on the data plane, the value of the data, corresponding to the fail pixel and recorded in the storage medium, will never change, no matter the intensity received by the pixel is a light state or a dark state, so as the value of the sensing signal generated by the corresponding pixel on the detecting apparatus will never change, either. Therefore, the sensing difference value is smaller than the threshold value, and the pixel on the data plane is determined as a fail pixel. Alternatively, if the pixel on the data plane is a good pixel, the corresponding pixel on the detecting apparatus can output a sensing signal with different value according to the intensity of the light state or the dark state, so as the sensing difference value is larger than the threshold value.

Figure 3:
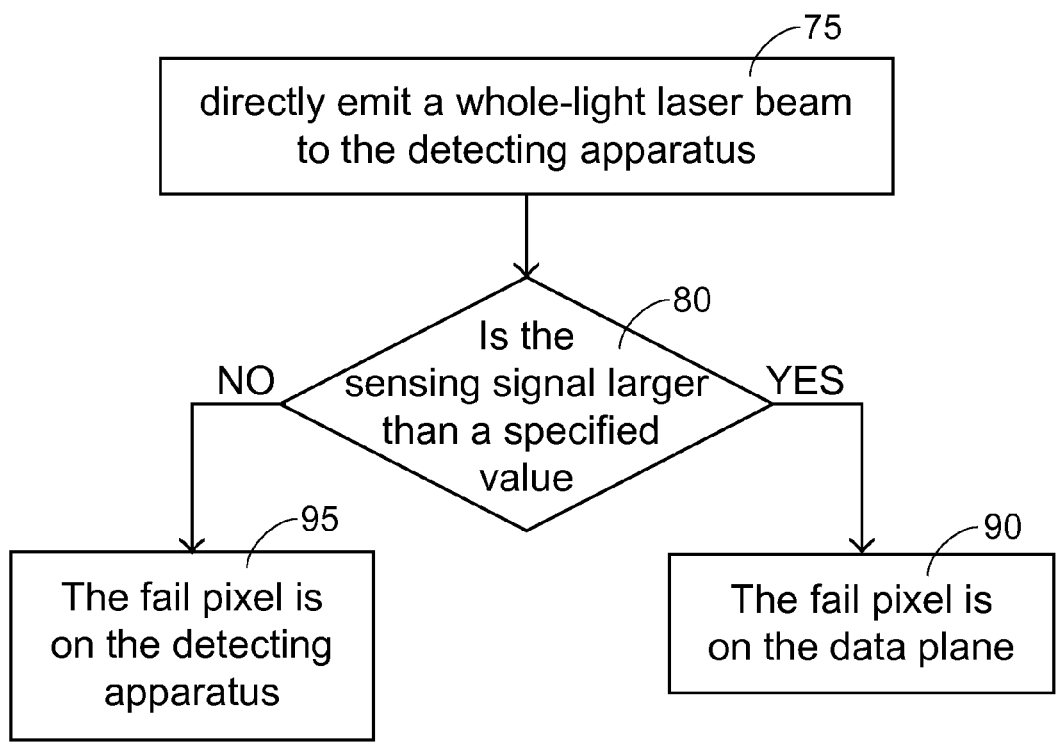
FIG. 3 is a flow chart of a method of determining a fail pixel is on a data plane or on a detecting apparatus in a holographic storage system of the present invention.

For further determining the fail pixel is on the data plane or on the detecting apparatus, the storage medium is removed from the holographic storage system. FIG. 3 is a flow chart of a method of determining a fail pixel is on a data plane or on a detecting apparatus in a holographic storage system of the present invention. As depicted in FIG. 3, the method includes steps of: directly emitting a whole-light laser beam to the detecting apparatus (step 75); detecting the corresponding sensing signal outputted from the pixel on the detecting apparatus, and checking whether the sensing signal is larger than a specified value (step 80); determining the fail pixel is on the data plane if the sensing signal is larger than a specified value (step 90); alternatively, determining the fail pixel is on the detecting apparatus if the sensing signal is smaller than a specified value (step 95).

According to the embodiment of the present invention, the controlling circuit of the holographic storage system will detect the fail pixel is existed or not according to the sensing signal outputted from each pixel on the detecting apparatus. A fail pixel is detected by comparing the sensing-difference value with the threshold, wherein the sensing-difference value is a difference of the different values of the sensing signal correspond to the light state and the dark state generated by a single pixel. If the fail pixel is detected, the fail pixel is on the data plane or on the detecting apparatus will be further determined by the method depicted in FIG. 3. In the embodiment, a whole-light laser beam is emitted to the detecting apparatus for further determining the fail pixel is on the data plane or on the detecting apparatus. It is understood that a whole-dark laser beam can be also adopted to emit to the detecting apparatus for determining the fail pixel is on the data plane or on the detecting apparatus. It is also understood that a whole-light laser beam and a whole-dark laser beam can be alternatively emitted to the detecting apparatus for determining the fail pixel is on the data plane or on the detecting apparatus.

Figure 4:
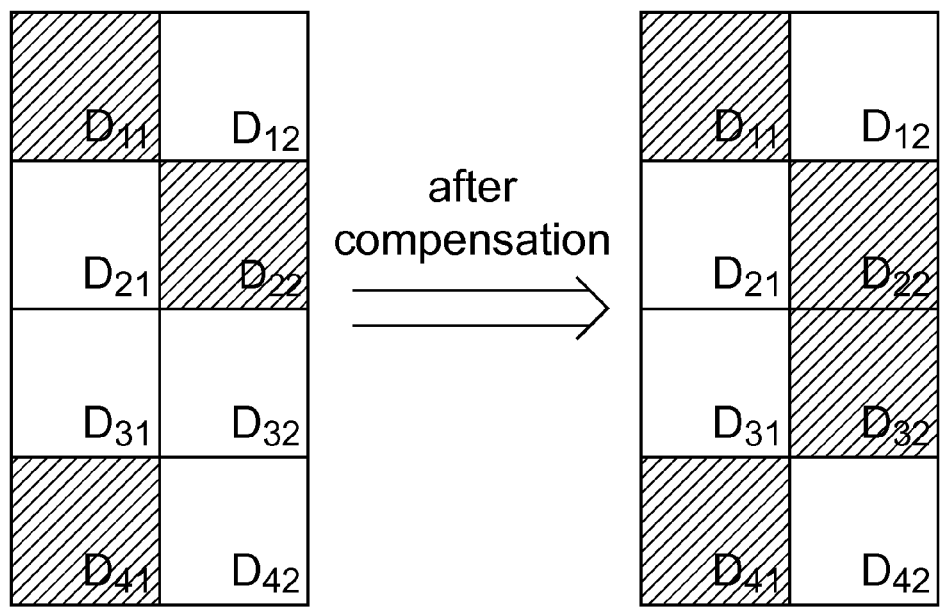
FIG. 4 is diagram of compensating a fail pixel of the present invention.

Moreover, once the position of the fail pixel is detected and recoded by the controlling circuit, the controlling circuit can compensate the fail pixel. FIG. 4 depicts a fail pixel is compensated by the present invention. Generally, an image frame is divided into a plurality of regions to make the image frame can be decode correctly, wherein the counts of the light pixels and the count of the dark pixels within each region is predefined, and the count of the light pixels and the count of the dark pixels within each region are usually designed to be equal.

Assuming the pixel D32 within a specified region is already determined as a fail pixel by the method of detecting fail pixels of the present invention. When the pixels D11, D22 and D41 are determined as dark states, and the pixels D12, D21, D31 and D42 are determined as light states, then the fail pixel D32 will be compensated to a dark state by the controlling circuit to make the count of the light pixels equal the count of dark pixels within the region. After all fail pixels within all regions are compensated, then the image frame is ready to be decoded. Therefore, the method of compensating the fail pixel of the present invention can estimate the fail pixel is representing a light state or representing a dark state, and the error rate of the data reading or data recording will decrease after all fail pixels are compensated by the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A method of detecting fail pixels in a holographic storage system, comprising steps of:
   sequentially providing a plurality of image frames to show on a data plane to make all pixels on the data plane capable of outputting a light state and a dark state;
   sequentially recording the image frames presented on the data plane in a storage medium;
   sequentially receiving the image frames recorded in the storage medium by using a detecting apparatus to make each pixel on the detecting apparatus can receive both the light state and the dark state and be capable of outputting a sensing signal with different values corresponding to the light state and the dark state received by the pixel;
   defining a sensing-difference value, which is a difference of the different values of the sensing signal outputted by one pixel;
   comparing the sensing-difference value with a threshold value;
   defining the corresponding pixel is a good pixel if the sensing-difference value is larger than the threshold value;
   defining the corresponding pixel is a fail pixel if the sensing-difference value is smaller than the threshold value;
   providing a laser beam to directly emit to the detecting apparatus;
   defining the fail pixel is on the data plane if the corresponding pixel can output a corresponding sensing signal; and
   defining the fail pixel is on the detecting apparatus if the corresponding pixel cannot output the corresponding sensing signal.

2. The method of claim 1, wherein the laser beam is a whole-light laser beam, and the corresponding sensing signal represents a large-amplitude sensing signal.

3. The method of claim 1, wherein the laser beam is a whole-dark laser beam, and the corresponding sensing signal represents a small-amplitude sensing signal.

4. A method of detecting fail pixels in a holographic storage system, comprising steps of:
   sequentially providing a plurality of image frames to show on a data plane to make all pixels on the data plane capable of outputting a light state and a dark state;
   sequentially recording the image frames presented on the data plane in a storage medium;
   sequentially receiving the image frames recorded in the storage medium by using a detecting apparatus to make each pixel on the detecting apparatus can receive both the light state and the dark state and be capable of outputting a sensing signal with different values corresponding to the light state and the dark state received by the pixel;
   defining a sensing-difference value, which is a difference of the different values of the sensing signal outputted by one pixel;
   comparing the sensing-difference value with a threshold value;
   defining the corresponding pixel is a good pixel if the sensing-difference value is larger than the threshold value;
   defining the corresponding pixel is a fail pixel if the sensing-difference value is smaller than the threshold value;
   providing a whole-light laser beam and a whole-dark laser beam to emit to the detecting apparatus;
   defining the fail pixel is on the data plane if the corresponding pixel can sequentially output a corresponding large-amplitude sensing signal and a corresponding small-amplitude sensing signal; and
   defining the fail pixel is on the detecting apparatus if the pixel cannot sequentially output the corresponding large-amplitude sensing signal and the corresponding small-amplitude sensing signal.

5. The method of claim 1, wherein the data plane is a spatial light modulator.

6. The method of claim 5, wherein the spatial light modulator is a digital micro-mirror device or a liquid crystal display.

7. The method of claim 1, wherein the storage medium is a photopolymer.

8. The method of claim 1, wherein the detecting apparatus is a charge-coupled device or a complementary metal oxide semiconductor.

9. A method of compensating fail pixels in a holographic storage system, applied to a region within a data plane and the region contains a first number of light states and a second number of dark states, comprising steps of:
   defining a light-state sum via counting the light states generated by pixels on a detecting apparatus corresponding to the region within the data plane;
   defining a dark-state sum via counting the dark states generated by pixels on the detecting apparatus corresponding to the region within the data plane;

defining a fail pixel outputting the dark state if the light-state sum is equal to the first number and the dark-state sum is not equal to the second number; and defining the fail pixel outputting the light state if the light-state sum is not equal to the first number and the dark-state sum is equal to the second number.

10. The method of claim 9, wherein the data plane is a spatial light modulator, and the spatial light modulator is a digital micro-mirror device or a liquid crystal display.

11. The method of claim 9, wherein the detecting apparatus is a charge-coupled device or a complementary metal oxide semiconductor.

12. A method of detecting and compensating fail pixels in a holographic storage system, applied to a region within a data plane and the region contains a first number of light states, comprising steps of:

sequentially providing a plurality of image frames to show on a data plane to make all pixels on the data plane capable of outputting a light state and a dark state;

sequentially recording the image frames presented on the data plane in a storage medium;

sequentially receiving the image frames recorded in the storage medium by using a detecting apparatus to make each pixel on the detecting apparatus can receive both the light state and the dark state and be capable of outputting a sensing signal with different values corresponding to the light state and the dark state received by the pixel;

defining a sensing-difference value, which is a difference of the different value of the sensing signal outputted by one pixel;

defining the corresponding pixel is a fail pixel if the sensing-difference value is smaller than a threshold value;

defining a first number of light states in a region within the data plane;

defining a light-state sum via counting the light states generated by pixels on the detecting apparatus corresponding to the region within the data plane if the fail pixel is on the region;

defining the fail pixel outputting the light state if the first number is not equal to the light-state sum; and defining the fail pixel outputting the dark state if the first number is equal to the light-state sum.

13. The method of claim 12 further comprising steps of:
providing a laser beam to directly emit to the detecting apparatus;

defining the fail pixel is on the data plane if the corresponding pixel can output a corresponding sensing signal; and defining the fail pixel is on the detecting apparatus if the corresponding pixel cannot output a corresponding sensing signal.

14. The method of claim 13, wherein the laser beam is a whole-light laser beam, and the corresponding sensing signal represents a large-amplitude sensing signal.

15. The method of claim 13, wherein the laser beam is a whole-dark laser beam, and the corresponding sensing signal represents a small-amplitude sensing signal.

16. The method of claim 12 further comprising steps of:
providing a whole-light laser beam and a whole-dark laser beam to emit to the detecting apparatus;

defining the fail pixel is on the data plane if the pixel can sequentially output a corresponding large-amplitude sensing signal and a corresponding small-amplitude sensing signal; and defining the fail pixel is on the detecting apparatus if the pixel cannot sequentially output a corresponding large-amplitude sensing signal and a corresponding small-amplitude sensing signal.

17. The method of claim 12, wherein the data plane is a spatial light modulator, and the spatial light modulator is a digital micro-mirror device or a liquid crystal display.

18. The method of claim 12, wherein the storage medium is a photopolymer.

19. The method of claim 12, wherein the detecting apparatus is a charge-coupled device or a complementary metal oxide semiconductor.

* * * * *